(12) United States Patent
Shao et al.

(10) Patent No.: US 12,405,603 B2
(45) Date of Patent: Sep. 2, 2025

(54) INDUSTRIAL INTERNET OF THINGS (IOT) FOR DETERMINING REPARABILITY OF DEFECTIVE PRODUCT, CONTROL METHOD, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Yuefei Wu, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 13 days.

(21) Appl. No.: 18/423,268

(22) Filed: Jan. 25, 2024

(65) Prior Publication Data
US 2024/0168466 A1    May 23, 2024

Related U.S. Application Data

(63) Continuation of application No. 18/172,268, filed on Feb. 21, 2023, now Pat. No. 11,921,498.

(30) Foreign Application Priority Data

Aug. 24, 2022    (CN) .......................... 202211015348.9

(51) Int. Cl.
G05B 19/418    (2006.01)
(52) U.S. Cl.
CPC .  *G05B 19/41875* (2013.01); *G05B 19/41835* (2013.01)

(58) Field of Classification Search
None
See application file for complete search history.

(56) References Cited

U.S. PATENT DOCUMENTS 9,729,639 B2 * 8/2017 Sustaeta ................ H04L 67/125
11,138,570 B1 * 10/2021 Leise ................... G07C 5/0808
(Continued)

FOREIGN PATENT DOCUMENTS

| CN | 113850488 A | 12/2021 |
|---|---|---|
| CN | 114637270 A | 6/2022 |

OTHER PUBLICATIONS

First Office Action in Chinese Application No. 202211015348.9 mailed on Oct. 25, 2022, 10 pages.
(Continued)

*Primary Examiner* — Jason Lin
(74) *Attorney, Agent, or Firm* — PORUS IP LLC

(57) ABSTRACT

The present disclosure provides an industrial IoT for determining repairability of a defective product, a control method, and a storage medium. The industrial IoT includes an obtaining module, a total correction cost determination module, and a defective product processing module. The obtaining module is configured to obtain defective product data. The total correction cost determination module is configured to in response to a determination that a number of the defective product is larger than 1, obtain a first defective product vector and a second defective product vector; determine a first total correction cost and at least one second total correction cost; determine, based on the first total correction cost and the at least one second total correction cost, a total correction cost. The defective product processing module is configured to determine, based on the total correction cost and a preset cost, whether the defective product is repairable.

17 Claims, 7 Drawing Sheets

(56) References Cited

U.S. PATENT DOCUMENTS

| | | | |
|---|---|---|---|
| 11,256,243 B2* | 2/2022 | Cella | G06N 3/02 |
| 2002/0099580 A1* | 7/2002 | Eicher, Jr. | G06Q 30/0607 |
| | | | 705/26.25 |
| 2003/0216930 A1 | 11/2003 | Dunham et al. | |
| 2004/0122625 A1* | 6/2004 | Nasser | G05B 23/0218 |
| | | | 702/185 |
| 2008/0128642 A1* | 6/2008 | Mos | G03F 7/70525 |
| | | | 250/492.22 |
| 2008/0294281 A1* | 11/2008 | Shimshi | G06Q 50/04 |
| | | | 700/110 |
| 2011/0061015 A1* | 3/2011 | Drees | H02J 13/00016 |
| | | | 700/275 |
| 2011/0224918 A1* | 9/2011 | Floeder | G01N 21/8922 |
| | | | 702/35 |
| 2017/0006135 A1* | 1/2017 | Siebel | G06F 8/24 |
| 2018/0189939 A1* | 7/2018 | Ghidotti Piovan | G01M 17/027 |
| 2019/0273784 A1* | 9/2019 | Shao | H04W 84/04 |
| 2020/0150628 A1* | 5/2020 | Vance | G05B 23/0275 |
| 2020/0156915 A1 | 5/2020 | Hofmann et al. | |
| 2022/0187847 A1* | 6/2022 | Cella | G06Q 10/06 |

OTHER PUBLICATIONS

Notification to Grant Patent Right for Invention in Chinese Application No. 202211015348.9 mailed on Nov. 2, 2022, 3 pages.

Zhang, Lei et al., Analysis on the Profit of Vendor Managed Inventory with Imperfect Products, Machinery Design & Manufacture, 6: 255-257, 2012.

MCC Support, Draft Report of 3GPP TSG RAN WG1 #73 v0. 1.0, 3GPP TSG RAN WG1 Meeting #74, 2013, 104 pages.

* cited by examiner

300

310 — When the product detection device detects the defective product, the product detection device packs defective product information and a defective product parameter as the defective product data, and sends the defective product data to a corresponding sub-platform of the sensing network platform

320 — The sub-platform of the sensing network platform is configured to transform the defective product data to a data file recognized by the management platform and send the data file to the general platform of the sensing network platform

330 — The general platform of the sensing network platform is configured to obtain the data file, and then send, based on sub-platform information of the sensing network platform, the data file to a corresponding sub-platform of the management platform

340 — The sub-platform of the management platform is configured to extract the defective product parameter based on the data file, and generate, according to different parameter items, a defective product parameter table corresponding to the defective product parameter, extract the defective product information as a first description item of the defective product parameter table and enter the first description item into the defective product parameter table, and then send the defective product parameter table to the general platform of the management platform

350 — After obtaining the defective product parameter table, the general platform of the management platform is configured to obtain parameter correction cost data corresponding to the different parameter items based on the defective product parameter table; calculate a sum of the parameter correction cost data of all parameter items as a total correction cost, compare the total correction cost with the preset cost of the general platform of the management platform, the preset cost is a single-piece manufacturing cost of a product corresponding to the defective product, and perform operation based on a comparison result

360 — In response to the comparison result that the total correction cost is lower than the preset cost, the general platform of the management platform is configured to determine that the defective product is correctable, and the general platform of the management platform is configured to issue a correction instruction to the corresponding sub-platform of the management platform, the general platform of the sensing network platform, the sub-platform of the sensing network platform, and the product detection device based on the first description item, the product detection device receives the correction instruction and assigns the corresponding product to a defective product correction assembly line based on the first description item

370 — In response to the comparison result that the total correction cost is higher than the preset cost, and the general platform of the management platform is configured to determine that the defective product is not correctable, the general platform of the management platform is configured to enter the parameter correction cost data of all parameter items and the total correction cost as a second description item into the defective product parameter table, and then send the defective product parameter table to the corresponding sub-platform of the service platform and the general platform of the service platform; the general platform of the service platform is configured to classify and sort the defective product parameter table based on the first description item and the second description item and store the defective product parameter table

610 — Performing a filtering operation on a defective product vector of the defective product to obtain a first defective product vector and a second defective product vector 620 — Determining the first total correction cost based on the first defective product vector 630 — Clustering the second defective product vector to determine at least one cluster center set 640 — Determining at least one second total correction cost based on at least one cluster center set 650 — Determining a total correction cost based on the first total correction cost and the at least one second total correction cost

INDUSTRIAL INTERNET OF THINGS (IOT) FOR DETERMINING REPARABILITY OF DEFECTIVE PRODUCT, CONTROL METHOD, AND STORAGE MEDIUM THEREOF

CROSS-REFERENCE TO RELATED APPLICATION

This application is a continuation of U.S. application Ser. No. 18/172,268, filed on Feb. 21, 2023, which claims priority of Chinese Patent Application No. 202211015348.9, filed on Aug. 24, 2022, the contents of each of which are entirely incorporated herein by reference.

TECHNICAL FIELD

The present disclosure involves the field of intelligent manufacturing technology, and specifically involves an industrial IoT for determining repairability of a defective product, a control method, and a storage medium.

BACKGROUND

A production efficiency has always been a focus of attention of enterprises. In the field of intelligent manufacturing technology, an assembly line may be set and operated by a plurality of intelligent manufacturing devices according to an order of operations or the order of manufacturing execution time. The single intelligent manufacturing device needs to be balanced by considering the overall production efficiency of the device on the entire assembly line, that is, the single intelligent manufacturing device needs to ensure a balance rate of the assembly line. If each intelligent manufacturing device can ensure and improve its own production efficiency, the overall production efficiency of the assembly line may be improved, and the time and cost of a single-piece product will be reduced.

To improve the production efficiency of the device and preferably achieve the highest efficiency corresponding to the device, it is necessary to make the device play its functions and performance and improve its work efficiency. This requires enterprises to eliminate a loss that hinders the efficiency to the most. Generally speaking, the loss of mechanical processing device may be roughly divided into the following seven losses: 1. failure loss; 2. preparation and adjustment loss; 3. tool replacement loss; 4. acceleration loss; 5. shutdown checking loss; 6. speed loss; 7. waste product and defective product correction loss.

The waste product and defective product correction loss refers to the loss caused by a waste product and a defective product correction. The waste product is certainly the loss, but the defective product correction further requires a lot of unnecessary manpower, materials, resources, and costs, which is also the loss that cannot be ignored.

For the defective product correction, it is necessary to perform a classified repair or a secondary processing according to unqualified items of the defective product, which involves more correction devices (mostly intelligent manufacturing devices that can perform corresponding repair or secondary processing, and the devices may also have their own product manufacturing tasks) to make the correction, and may also need to increase the corresponding correction materials, spare parts, manpower and other resources. Therefore, the defective product correction may not only increase a workload of the corresponding correction device, reduce the manufacturing efficiency of its normal products, but also increase the use of resources and increase the cost. Sometimes, a total cost of the correction may be higher than the single piece manufacturing cost of the product corresponding to the defective product.

In the current manufacturing process, after the defective product appears, the defective product may generally be transferred directly to a corresponding correction assembly line for correction. As the defective product correction not only seriously affects the manufacturing efficiency of the normal product by other correction device, but also increase the cost. If the cost of correction the corresponding defective products may be reasonably calculated, and it may be determined whether it is necessary to correct defective products through cost accounting, and then the defective products with excessive correction cost or excessive correction resource consumption may be excluded and not corrected, which may reduce the cost and ensure a normal working efficiency of the corresponding correction device, thereby reducing a correction loss of the waste product and the defective product.

Therefore, combined with intelligent manufacturing, what needs to be solved urgently is how to control the correction of defective products on the basis of considering the cost.

SUMMARY

The technical problem to be solved by the present disclosure is to provide an industrial Internet of Things for determining repairability of a defective product. The industrial IoT may determine whether the defective product may be used for correction according to the correction cost of defective products, which may reduce cost and consumption time corresponding to correction device by selectively correcting defective products, reduce the cost and loss of defective products in the manufacturing process, further ensure the efficiency of the normal product manufacturing of the correction device, and then reduce the loss of waste products and a defective product correction.

One of the embodiments of the present disclosure provides an industrial IoT for determining repairability of a defective product, including: an obtaining module, a total correction cost determination module, and a defective product processing module. The obtaining module is configured to obtain defective product data; the total correction cost determination module is configured to in response to a determination that a number of the defective product is larger than 1, perform a filtering operation on a defective product vector of the defective product to obtain a first defective product vector and a second defective product vector, the defective product vector being constructed based on the defective product data, wherein the first defective product vector is a filtered-out defective product vector, and the second defective product vector is a defective product vector left after filtering; determine, based on the first defective product vector, a first total correction cost; cluster the second defective product vector to determine at least one cluster center set; for each of the at least one cluster center set, determine, based on one or more center set features, a number of raw material and manpower required by the cluster center set through a second prediction model, the second prediction model being a machine learning model; wherein the second prediction model is obtained through training based on a plurality of labeled training samples, and a training process of the second prediction model includes: inputting the plurality of labeled training samples to an initial second prediction model, constructing a loss function by the labels and an output result of the initial second prediction model, and updating a parameter of the initial second prediction model iteratively based on the loss function; wherein when the loss function of the initial second prediction model satisfies a preset condition, the training process is completed, and a trained second prediction model is obtained; and the training samples including sample center set features of a plurality of sample cluster center sets, and the labels indicating a number of raw material and manpower required for the sample cluster center sets; determine, based on the number of raw material and the manpower required by the each of the at least one cluster center set, at least one second total correction cost; and determine, based on the first total correction cost and the at least one second total correction cost, a total correction cost.

One of the embodiments of the present disclosure provides a control method of the industrial IoT for determining repairability of a defective product, including: obtaining defective production data; in response to a determination that a number of the defective product is larger than 1, performing a filtering operation on a defective product vector of the defective product to obtain a first defective product vector and a second defective product vector, the defective product vector being constructed based on the defective product data, wherein the first defective product vector is a filtered-out defective product vector, and the second defective product vector is a defective product vector left after filtering; determining, based on the first defective product vector, a first total correction cost; clustering the second defective product vector to determine at least one cluster center set; for each of the at least one cluster center set, determining, based on one or more center set features, a number of raw material and manpower required by the cluster center set through a second prediction model, the second prediction model being a machine learning model; wherein the second prediction model is obtained through training based on a plurality of labeled training samples, and a training process of the second prediction model includes: inputting the plurality of labeled training samples to an initial second prediction model, constructing a loss function by the labels and an output result of the initial second prediction model, and updating a parameter of the initial second prediction model iteratively based on the loss function; wherein when the loss function of the initial second prediction model satisfies a preset condition, the training process is completed, and a trained second prediction model is obtained; and the training samples including sample center set features of a plurality of sample cluster center sets, and the labels indicating a number of raw material and manpower required for the sample cluster center sets; determining, based on the number of raw material and the manpower required by the each of the at least one cluster center set, at least one second total correction cost; and determining, based on the first total correction cost and the at least one second total correction cost, a total correction cost; and determining, based on the total correction cost and a preset cost, whether the defective product is repairable, and performing a preset operation based on a determination result.

One of the embodiments of the present disclosure provides a non-transitory computer-readable storage medium storing computer instructions, when reading the computer instructions in the storage medium, a computer implements the control method for the industrial IoT for determining repairability of a defective product.

Compared with the existing technology, the beneficial effects of the present disclosure are as follows: the industrial IoT and its control methods for determining repairability of the defective product are provided. The Industrial IoT is built on the basis of the five-platform structure, and the service platform, the management platform, and the sensing network platform are arranged in a front sub-platform layout. A general platform of the service platform, the management platform, and the sensing network platform may uniformly receive, analyze, and process data of an upper platform, which facilitates an independent processing and classification of the data of the upper platform and various sub-platforms. Each sub-platform corresponding to the general platform operates independently, and may be divided into several independent data processing channels based on a demand. Then different data may be processed and transmitted through different channels. Therefore, a data processing pressure on the corresponding general platform may be shared, and a data processing capacity requirement of each sub-platform may be reduced. It may further ensure an independence of each data, ensure a classified transmission and a traceability of the data and a classified issuing and processing of an instruction, so that the IoT structure and data processing may be clear and controllable, which facilitates the control and data processing of the IoT.

When applying the present disclosure, a product detection device may send the detected information and a parameter of the defective product to the sensing network platform. After processed by the sensing network platform, the information and parameter may be sent to a corresponding sub-platform of the management platform, and the sub-platform of the management platform may compile the corresponding information and parameter into corresponding data and form a defective product parameter table recognized and called by the general platform of the management platform. The general platform of the management platform may calculate a correction cost of the corresponding defective product based on the defective product parameter table, and compare the correction cost and a preset cost, so as to screen out the defective product that meets a cost requirement for correction, and the defective product that does not meet the cost requirement may be processed through another process. In this way, a number of defective product corrections may be controlled through the cost, and the correction cost and a defective product correction loss may be reduced through adjusting a correction ratio of the defective products, which ensures and improves a normal efficiency of the correction device, and reduces an unnecessary expenditure.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which same reference numerals represent same structures throughout the several views of the drawings, and wherein:

FIG. 3 is an exemplary flowchart illustrating a control method of the industrial IoT for correction and regulation of defective product according to some embodiments of the present disclosure;

FIG. 6 is an exemplary flowchart illustrating the control method of the industrial IoT for correction and regulation of defective product according to some other embodiments of the present disclosure;

DETAILED DESCRIPTION

Figure 1:
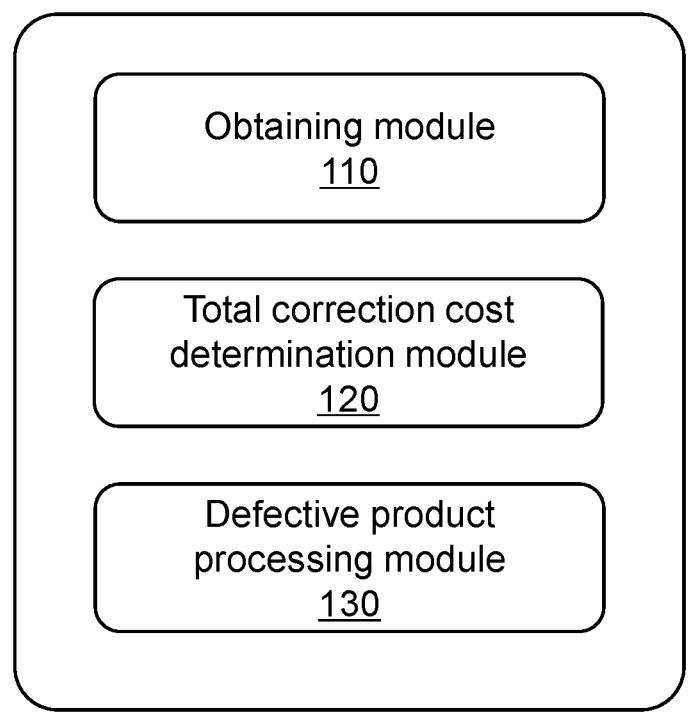
FIG. 1 is a module diagram illustrating an industrial IoT system for correction and regulation of defective product according to some embodiments of the present disclosure.

The technical solutions of the present disclosure embodiments will be more clearly described below, and the accompanying drawings need to be configured in the description of the embodiments will be briefly described below. Obviously, the drawings in the following description are merely some examples or embodiments of the present disclosure, for those of ordinary skill in the art, the present disclosure will be applied to other similar scenarios according to these accompanying drawings without having to pay creative labor. Unless obviously obtained from the context or the context illustrates otherwise, the same numeral in the drawings refers to the same structure or operation.

It should be understood that the terms "system", "device", "unit" and/or "module" used in this disclosure are a method used to distinguish different components, components, components, parts, or assembly of different levels. However, if other words may achieve the same purpose, the words may be replaced by other expressions.

As shown in the present disclosure and claims, unless the context clearly prompts the exception, the words "a", "an", "an" and/or "the" are not intended to specifically refer to the singular, but may also include the plural. Generally speaking, the terms "comprise," "comprises," and/or "comprising," "include," "includes," and/or "including" only imply that the clearly identified steps and elements are included, these steps and elements do not constitute an exclusive list, and the method or equipment may also include other steps or elements.

The flowcharts are used in present disclosure to illustrate the operations performed by the system according to the embodiment of the present disclosure. It is to be expressly understood that the operations of the flowchart may be not implemented in order. Conversely, the operations may be implemented in inverted order, or simultaneously. Moreover, one or more other operations may be added to the flowcharts. One or more operations may be removed from the flowcharts.

FIG. 1 is a module diagram illustrating an industrial IoT system for correction and regulation of defective product according to some embodiments of the present disclosure. As shown in FIG. 1, an industrial IoT system 100 for correction and regulation of defective product may include an obtaining module 110, a total correction cost determination module 120 and a defective product processing module 130.

The obtaining module 110 may be configured to obtain defective product data, which may be performed by an object platform of the industrial IoT for correction and regulation of defective product. For more details of the defective product data, please refer to FIG. 4 and the related descriptions.

The total correction cost determination module 120 may be configured to determine a total correction cost based on the defective product data, which may be performed by a sensing network platform or a management platform of the industrial IoT for correction and regulation of defective product. For more details of the total correction cost, please refer to FIGS. 4-7 and the related descriptions.

The defective product processing module 130 may be configured to determine whether the defective product is repairable based on the total correction cost and a preset cost, and perform subsequent processing based on a determination result. The defective product processing module may be performed by a user platform, a service platform, the management platform, the sensing network platform, and the object platform of the industrial IoT for correction and regulation of defective product. For more details of the determination result and the subsequent processing, please refer to FIGS. 2-3 and the related descriptions.

It should be understood that the system and modules shown in FIG. 1 may be implemented in various ways.

It should be noted that the above descriptions of the system and modules of the industrial IoT for correction and regulation of defective product are only for the convenience of description, which cannot limit the scope of the present disclosure. It can be understood that after understanding the principle of the system, those skilled in the art may arbitrarily combine each module or form a subsystem to connect with other modules without departing from this principle. In some embodiments, the obtaining module 110, the total correction cost determination module 120 and the defective product processing module 130 disclosed in FIG. 1 may be different modules in one system, or may be one module that implements a function of two or more functions of the above modules. For example, each module may share one storage module, and each module may also have its own storage modules. Such deformation is within the protection scope of this disclosure.

Figure 2:
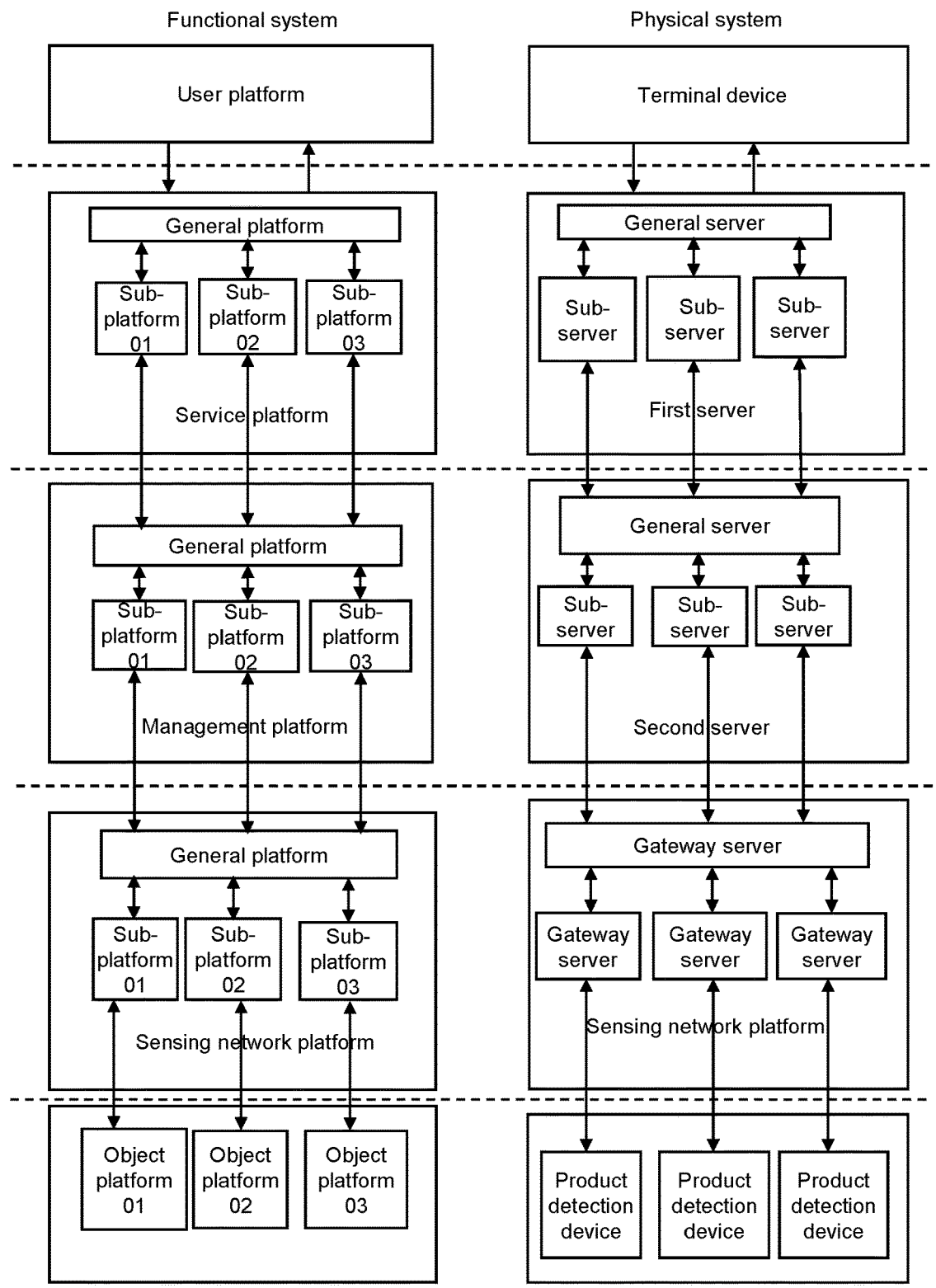
FIG. 2 is a structural framework diagram illustrating the industrial IoT for correction and regulation of defective product according to some embodiments of the present disclosure.

FIG. 2 is a structural framework diagram illustrating the industrial IoT for correction and regulation of defective product according to some embodiments of the present disclosure. As shown in FIG. 2, some embodiments of the present disclosure aim to provide an industrial IoT 200 for correction and regulation of defective product, including a user platform, a service platform, a management platform, an object platform, and a sensing network platform that interact from top to bottom.

The service platform, the management platform, and the sensing network platform are all arranged in a front-sub-platform layout. The front-sub-platform layout refers to that the service platform, the management platform, and the sensing network platform are respectively provided with a general platform and a plurality of sub-platforms, the plurality of sub-platforms respectively store and process data of different types and different receiving objects sent by a lower platform, and the general platform stores and processes the data of the plurality of sub-platforms after summary, and transmits the data of the plurality of sub-platforms to the upper platform. The object platform is configured as a product detection device of intelligent manufacture.

When the product detection device detects the defective product, the product detection device packs defective product information and a defective product parameter as the defective product data, and sends the defective product data to a corresponding sub-platform of the sensing network platform.

The sub-platform of the sensing network platform is configured to transform the defective product data to a data file recognized by the management platform and send the data file to the general platform of the sensing network platform.

The general platform of the sensing network platform is configured to obtain the data file, and then send, based on sub-platform information of the sensing network platform, the data file to a corresponding sub-platform of the management platform.

The sub-platform of the management platform is configured to extract the defective product parameter based on the data file, and generate, according to different parameter items, a defective product parameter table corresponding to the defective product parameter, extract the defective product information as a first description item of the defective product parameter table and enter the first description item into the defective product parameter table, and then send the defective product parameter table to the general platform of the management platform.

After obtaining the defective product parameter table, the general platform of the management platform is configured to obtain parameter correction cost data corresponding to the different parameter items based on the defective product parameter table; calculate a sum of the parameter correction cost data of all parameter items as a total correction cost, compare the total correction cost with the preset cost of the general platform of the management platform, the preset cost is a single-piece manufacturing cost of a product corresponding to the defective product, and perform operation based on a comparison result.

In response to the comparison result that the total correction cost is lower than the preset cost, the general platform of the management platform is configured to determine that the defective product is correctable. At this time, the general platform of the management platform is configured to issue a correction instruction to the corresponding sub-platform of the management platform, the general platform of the sensing network platform, the sub-platform of the sensing network platform, and the product detection device based on the first description item, the product detection device receives the correction instruction and assigns the corresponding product to a defective product correction assembly line based on the first description item.

In response to the comparison result that the total correction cost is higher than the preset cost, the general platform of the management platform is configured to determine that the defective product is not correctable. At this time, the general platform of the management platform is configured to enter the parameter correction cost data of all parameter items and the total correction cost as a second description item into the defective product parameter table, and then send the defective product parameter table to the corresponding sub-platform of the service platform and the general platform of the service platform; the general platform of the service platform is configured to classify and sort the defective product parameter table based on the first description item and the second description item and store the defective product parameter table.

It should be noted that, as a physical architecture of the industrial IoT, it is specifically that: the user platform configured as a terminal device that interacts with a user; the service platform configured as a first server that receives an instruction of the user platform and sends the instruction to the management platform, extracts and processes information required by the user platform from the management platform, and sends the information to the user platform; the management platform configured as a second server that controls an operation of the object platform, and receives feedback data of the object platform; the sensing network platform configured as a communication network and a gateway for an interaction between the object platform and the management platform; and the object platform configured as a product detection device of intelligent manufacture. As this part is a comparatively common architecture in existing technologies, this embodiment will not make redundant descriptions.

It should be noted that the correspondence in this embodiment means that each product detection device individually corresponds to a sub-platform of the sensing network platform, a sub-platform of the management platform, and a sub-platform of the service platform. The corresponding sub-platforms of the different product detection devices may not be shared. For example, the corresponding data of a product detection device 01 may be only transmitted and processed through the sub-platform 01 of the sensing network platform, the sub-platform 01 of the management platform, and the sub-platform 01 of the service platform, the corresponding data of a product detection device 02 may be only transmitted and processed through the sub-platform 02 of the sensing network platform, the sub-platform 02 of the management platform, and the sub-platform 02 of the service platform, and the data of the product detection device 01 may not be transmitted and processed through the sub-platforms corresponding to the product detection device 02, which forms independent paths from each other.

In the existing field of intelligent manufacturing technology, when the product detection device such as a weighing device, a size image recognizer, a size measuring instrument, a surface roughness tester, a thickness instrument, a crack flaw detector, etc. detect the defective product, and the product does not meet the specified manufacturing requirements to form defective product items, for example, the size (thickness, length, width, diameter, depth, curvature, etc.) is too large or too small (a part of small defective product items may be corrected by a reinforced welding, a welding, a splicing, a pressing, etc.), the surface roughness is not enough, the coaxiality is too low, the width or thickness of the welding line is too large or too small, etc., the defective product items may be corrected, then the product detection device may assign the defective product to the corresponding correction device or correction assembly line. However, when some defective product items are corrected, more working hours, raw material, and devices may be required. For example, when the size of a workpiece is too small and needs to be corrected by welding, it needs corresponding raw material, auxiliary materials, and a welding device. The welding line also needs to be re-machined, ground, and polished, which may use a machine device and a polishing device. Moreover, before welding, it is necessary to grind and remove impurities in the welding area of the workpiece to ensure the welding effect, and it is also necessary to use a transferring system for corresponding transferring and distribution. The material cost, device energy consumption cost, logistics cost, and a cost of working time loss of delaying the normal manufacturing of the device due to the correction of defective products, etc., may be integrated, causing that the cost may be higher than the normal manufacturing cost of the workpiece. If such defective products are all corrected, although the production volume of a product may be guaranteed, it may undoubtedly increase the burden and cost of intelligent manufacturing, which is not worth the loss. Based on this, as the defective product correction may not only affect the manufacturing efficiency of the normal product of other correction devices, but also increase the cost. If the cost of correcting the corresponding defective product may be reasonably calculated, and whether it is necessary to correct the product may be determined, and then the defective products with excessive cost or excessive resource consumption may be excluded and not corrected, it is possible to reduce costs and ensure the normal working efficiency of the correction device, thereby reducing the correction loss of the waste products and defective products.

Through the above industrial IoT, by calculating and comparing the overall correction cost of a defective product, it is determined whether the defective product may be corrected, and then a correction ratio of the defective products may be adjusted. In this way, the unreasonable cost consumption and loss in the process of defective product correction may be controlled, and the correction cost as well as redundant workload of the correction device may be reduced at the same time, so that the correction device may better perform its normal manufacturing tasks, then ensure its working efficiency, and make the intelligent manufacturing more reasonable and efficient.

The single-piece manufacturing cost of the product corresponding to the defective product described in this embodiment refers to a sum of the manufacturing costs required for the product corresponding to the defective product to meet the manufacturing standard according to a normal manufacturing process, and the cost of raw material required for the product may be considered according to an actual need.

It should be noted that the user platform in this embodiment may be a desktop computer, a tablet computer, a laptop computer, a mobile phone, or other electronic devices that can realize data processing and data communication, which is not repeated here. In specific applications, the first server and the second server can use a single server or a server cluster without much restriction. It should be understood that the data processing process mentioned in this embodiment can be processed through the server's processor, and the data stored on the server can be stored on the server's storage device, such as a hard disk and other memories. In specific applications, the sensor network platform may adopt a plurality of groups of gateway servers or a plurality of groups of intelligent routers, which are not limited here. It should be understood that the data processing process mentioned in the embodiments of this the present disclosure may be performed through a processor of the gateway server, and the data stored in the gateway server may be stored in the storage device of the gateway server, such as a hard disk and an SSD memory.

In some embodiments, the defective product information may at least include a name, a number and a model of the product corresponding to the defective product. The defective product parameter may at least include a defective product parameter number and an error of the product corresponding to the defective product. It should be noted that the defective product parameter number is the parameter number of a defective item corresponding to the defective product. For example, a defective product length parameter may be numbered as 01, a defective product weld parameter may be numbered as 02, a defective product surface roughness parameter may be numbered as 03, etc. When the defective product parameter number in the collected defective product parameter is 02, then the defective product parameter may be the weld parameter. In the same way, the error refers to a difference between the parameter corresponding to the defective product parameter number and a standard value. For example, the error may be +0.5 mm, −2 mm, +01.5 mm, −φ1 mm, where a positive sign means that the parameter is greater than the standard value, and a negative sign means that the parameter is less than the standard value.

After obtaining the defective product parameter table, the general platform of the management platform may obtain the parameter correction cost data corresponding to different parameter items based on the defective product parameter table, and calculate a sum of the parameter correction cost data of all parameter items as a total correction cost, including follow operations.

The general platform of the management platform may store a parameter correction cost table.

When the general platform of the management platform obtains the defective product parameter table, the general platform of the management platform extracts different parameter items in the defective product parameter table in sequence. The parameter correction cost data of different parameter items may be calculated based on the defective product parameter of different parameter items and the parameter correction cost table.

The parameter correction cost data of all the parameter items may be added to obtain a total correction cost.

In this embodiment, the parameter correction cost table may be pre-stored through the general platform of the management platform. By extracting the defective product parameter corresponding to the defective product parameter table, the correction cost of the parameter item corresponding to the defective product may be found through the parameter correction cost table to obtain the total correction cost.

It should be noted that the parameter correction cost table at least includes a plurality of different parameter correction items, each parameter correction item has corresponding single-item cost data, and the parameter correction item at least includes a correction process number. When the correction process number is the same as the defective product parameter number, the single-item cost data corresponding to the correction process number may be retrieved to calculate the parameter correction cost data corresponding to the defective product parameter number.

The correction process number is the number of the process involved in a certain parameter of the defective product correction, for example, a cutting process number 01 for length correction, a welding process number 02 for welding, a polishing process number 03 for grinding and polishing, etc. When the defective product parameter number is 01, it means that it is the defective product length parameter, and the correction may be done through the cutting process, so the parameter correction cost data may be calculated directly according to the single-item cost data of the cutting process number 01 corresponding to the number 01.

When calculating, the single-item cost data may be the cost data of the corresponding parameter correction item, most of which may be baseline cost data. For example, the cutting process number 01 corresponds to the cutting process, and the single-item cost data of the cutting process may be X mm/yuan, that is, cutting a length (unit: mm) of X requires one yuan. It may further be X h/yuan, that is, cutting X h requires one yuan, where X may be calculated reasonably based on the energy consumption and working hours of the corresponding equipment.

Through the above single-item cost data, when the defective product parameter of the corresponding item of the defective product, i.e., the defective product parameter number and the error, are obtained, the corresponding correction process number may be found according to the defective product parameter number, and then the parameter correction cost data of the corresponding parameter item may be calculated through the error and the single item cost data. For example, the defective product parameter number may be 01, then the correction process number 01 may be found through the defective product parameter number 01, and through the error of the defective product parameter number 01, the error and the single-item cost data of the corresponding correction process number 01 may be multiplied to obtain a total cost required for the error. Finally, the parameter correction cost data of all the parameter items may be added to obtain the total correction cost.

It should be noted that the parameter correction item further includes one or more correction devices corresponding to the correction process number. When the correction process number corresponds to a plurality of correction devices, each correction device corresponds to single-item cost data. When the general platform of the management platform calculates the parameter correction cost data of the parameter item corresponding to the correction process number, the smallest single item cost data among the single item cost data of the plurality of correction devices is selected for calculation.

For better understanding, a specific description is given below in conjunction with Table 1 and Table 2. To express the corresponding relationship among the parameter correction item, the single-item cost, the first description item, and the second record item, this embodiment adds the first description item and the second description item to Table 1 at the same time for description.

Assuming the defective product parameter is as the following Table 2:

TABLE 2 defective product parameter table

| Serial No. | Defective product parameter number | Error (mm) | First description item | | |
|---|---|---|---|---|---|
| | | | name | number | model |
| 1 | 01 | +4 | camshaft | 01 | GT-TLZ-03 |
| 2 | 02 | −3 | | | |
| 3 | 03 | +2 | | | |

Based on the Table 1 and the Table 2, when the obtained defective product has three defective product parameters 01/02/03, the corresponding correction process numbers 01/02/03 may be found through the numbers of the three defective product parameters according to the Table 1, and then the corresponding correction costs of the three defective product parameters may be calculated. In the calculation of item 01, the corresponding single-item cost of 2 mm/yuan may be found through the correction process number 01, and then the cost of single-item item may be multiplied by the error of +4 mm corresponding to the defective product parameter 01 to obtain that the parameter correction cost of the defective product parameter 01 is 8 yuan. In this way, the parameter correction cost of the defective product parameters 02/03 may be calculated as 18 yuan and 4 yuan respectively (the defective product parameter 03 selects the polishing device 03 with the smallest cost to calculate the cost). Three data may be added to 8+18+4=30 yuan, that is, the total correction cost of the defective product is 30 yuan. The total cost required when correcting the defective product may be calculated through the above parameter correction cost table.

In some embodiments, the general platform of the service platform classifies, sorts, and then stores the defective product parameter table based on the first description item and the second description item, including follow operations. The general platform of the service platform classifies the corresponding defective product parameter table to the corresponding category based on the first description item of the defective product parameter table. In the corresponding category, the general platform of the service platform sorts

TABLE 1 parameter correction cost table

| | Parameter correction item | | | | | | Second description item | |
|---|---|---|---|---|---|---|---|---|
| Serial No. | Correction process number | Correction device | Single-item cost (mm/yuan) | First description item | | | Parameter correction cost (yuan) | Total correction cost (yuan) |
| | | | | name | number | model | | |
| 1 | 01 | machine device | 2 | camshaft | 01 | GT-TLZ-03 | 8 | 30 |
| 2 | 02 | welding device | 6 | | | | 18 | |
| 3 | 03 | polishing device 01 | 3 | | | | / | |
| | | polishing device 02 | 4 | | | | / | |
| | | polishing device 03 | 2 | | | | 4 | | all the defective product parameter tables in an ascending order according to a size of the total correction cost based on the second description item. The general platform of the service platform defective product parameter table stores in the corresponding sequence position and sends the classification information of the defective product parameter table to the user platform.

Taking Table 1 as an example, when the general platform of the service platform performs the classification, the name may be used as the classification information, and the defective products with the same name may be divided into a category to facilitate subsequent processing of defective products with the same name. Alternatively, the model may be used as the classification information, and the defective products with the same model (different specifications) may be divided into a category to facilitate subsequent processing of defective products with the same model. For example, GT-TLZ-03 is a model of the table 1, where GT represents a cylinder, TLZ represents a camshaft, and 03 represents the number of the camshaft. In this way, when the model is classified, GT may be used as a classification information, and the defective products belong to GT may be divided into one category, so that after classification, all the parts or components belonging to GT may be in the same category, which is convenient for subsequent processing.

Further, after the classification is completed, in the corresponding category, the general platform of the service platform may sort all the defective product parameter tables in an ascending order according to a size of the total correction cost based on the second description item. That is, in the same category, all defective product parameter tables may be arranged from small to large in accordance with the size of the total correction cost to form a data set with the total correction cost sorted in an ascending order for storage, and the classification information of all the defective product parameter tables may be sent to the user platform.

In some embodiments, when the total correction cost is greater than a preset cost, the general platform of the management platform performs synchronously follow operations: the general platform of the management platform issues a processing instruction to the corresponding sub-platform of the management platform, the general platform of the sensing network platform, the sub-platform of the sensing network platform, and the product detection device, the product detection device performs defective product processing on the corresponding defective product based on the processing instruction. The defective product processing may be temporarily storing, centralized storing, or transporting the defective products that do not satisfy the correction requirements to the product area to be processed.

In the actual manufacturing process, some defective products that may be corrected but do not meet the correction cost may be re-corrected due to product output requirements and reduction of product manufacturing tasks. At this time, the correction and regulation of the defective product may be performed again according to the classification need and cost control, etc.

Based on this, after the user platform issues a retrieval instruction based on the classification information of the defective product parameter table, the general platform of the service platform may retrieve all defective product parameter tables in the corresponding classification based on the retrieval instruction and send all defective product parameter tables to the user platform in the order of storage.

The user platform may select the defective product parameter table that satisfies the cost requirement based on the second description item in the defective product parameter table to form a defective product correction list, and send the defective product correction list to the general platform of the service platform.

The general platform of the service platform may retrieve the corresponding defective product parameter table based on the defective product correction list, and extract the corresponding first description item in the defective product parameter table as re-correction product information and sends re-correction product information to the sub-platform of the corresponding service platform and the general platform of the management platform.

The general platform of the management platform may respectively issue a re-correction instruction to the corresponding sub-platform of the management platform, the sub-platform of the sensor network platform, and the product detection device based on the re-correction product information; and the product detection device may retrieve the corresponding defective product to the defective product correction assembly line based on the re-correction instruction.

FIG. 3 is an exemplary flowchart illustrating a control method for the industrial IoT for correction and regulation of defective product according to some embodiments of the present disclosure. In some embodiments, as shown in FIG. 3, the process 300 includes the following operations. In some embodiments, the process 300 may be performed by the industrial IoT 200 for correction and regulation of defective product.

In 310, when the product detection device detects the defective product, the product detection device packs defective product information and a defective product parameter as the defective product data, and sends the defective product data to a corresponding sub-platform of the sensing network platform.

In 320, the sub-platform of the sensing network platform is configured to transform the defective product data to a data file recognized by the management platform and send the data file to the general platform of the sensing network platform.

In 330, the general platform of the sensing network platform is configured to obtain the data file, and then send, based on sub-platform information of the sensing network platform, the data file to a corresponding sub-platform of the management platform.

In 340, the sub-platform of the management platform is configured to extract the defective product parameter based on the data file, and generate, according to different parameter items, a defective product parameter table corresponding to the defective product parameter, extract the defective product information as a first description item of the defective parameter table and enter the first description item into the defective product parameter table, and then send the defective product parameter table to the general platform of the management platform.

In 350, after obtaining the defective product parameter table, the general platform of the management platform is configured to obtain parameter correction cost data corresponding to the different parameter items based on the defective product parameter table; calculate a sum of the parameter correction cost data of all parameter items as a total correction cost, compare the total correction cost with the preset cost of the general platform of the management platform, the preset cost is a single-piece manufacturing cost of a product corresponding to the defective product, and perform operation based on a comparison result.

In 360, in response to the comparison result that the total correction cost is lower than the preset cost, the general platform of the management platform is configured to determine that the defective product is correctable, and the general platform of the management platform is configured to issue a correction instruction to the corresponding sub-platform of the management platform, the general platform of the sensing network platform, the sub-platform of the sensing network platform, and the product detection device based on the first description item, the product detection device receives the correction instruction and assigns the corresponding product to a defective product correction assembly line based on the first description item.

In 370, in response to the comparison result that the total correction cost is higher than the preset cost, the general platform of the management platform is configured to determine that the defective product is not correctable, and the general platform of the management platform is configured to enter the parameter correction cost data of all parameter items and the total correction cost as a second description item into the defective product parameter table, and then send the defective product parameter table to the corresponding sub-platform of the service platform and the general platform of the service platform; the general platform of the service platform is configured to classify and sort the defective product parameter table based on the first description item and the second description item and store the defective product parameter table.

Those skilled in the art may realize that the units and algorithm operations described in the embodiments of the present disclosure can be implemented by electronic hardware, computer software or the combination of them. In order to clearly explain the interchangeability of the hardware and the software, the composition and the steps of each embodiment have been described in general by functions in the above description. Whether these functions are performed in hardware or software depends on the specific application and design constraints of the technical scheme. Professional and technical personnel can use different methods to implement the described functions on each specific application, but this implementation should not be considered to exceed the scope of the present disclosure.

In several embodiments provided in the present disclosure, it should be understood that the disclosed devices and methods can be implemented in other ways. For example, the device embodiments described above are only schematic. For example, the division of the units is only a logical function division, and there may be another division way in case of actual implementation. For example, multiple units or components can be combined or can be integrated into another system, or some features can be ignored or not executed. In addition, the mutual coupling or direct coupling or communication connection shown or discussed can be indirect coupling or communication connection through some interfaces, devices, or units, or electrical, mechanical, or other forms of connection.

The units described as separate parts may or may not be physically separate. The ordinary technical personnel in this field may realize that the units and algorithm operations described in the embodiments of the present disclosure may be implemented by an electronic hardware, a computer software, or a combination of both. In order to clearly explain the interchangeability of the hardware and the software, the composition and the steps of each embodiment have been described in general by functions in the above description. Whether these functions are performed in hardware or software depends on the specific application and design constraints of the technical scheme. Professional and technical personnel can use different methods to implement the described functions on each specific application, but this implementation should not be considered to exceed the scope of the present disclosure.

In addition, each functional unit in each embodiment of the present disclosure may be integrated in one processing unit, each functional unit exists physically separately, or two or more units are integrated in one unit. The above integrated units can be realized in the form of hardware or software functional units.

If the integrated unit is realized in the form of software functional unit and sold or used as an independent product, it can be stored in a computer-readable storage medium. To this understanding, the technical scheme of the present disclosure essential or contributive to the prior art, or all or part of the technical scheme can be reflected in the form of software products. The computer software product is stored in a storage medium, including several instructions to enable a set of computer equipment (may be a personal computer, a server, or grid equipment, etc.) to execute all or part of the steps of the methods described in each embodiment of the present disclosure. The aforementioned storage media include: USB flash disk, mobile hard disk, read only memory (ROM), random access memory (RAM), magnetic disc or optical disc and other media that can store program code.

The specific implementation methods described above have further explained the purpose, technical solution, and beneficial effects of the present disclosure. It should be understood that the above are only specific embodiments of the present disclosure, and not intended to limit the protection scope of the present disclosure. Any modification, equivalent replacement, improvement made within the spirit and principle of the present disclosure etc., should be included within the protection scope of the present disclosure.

Figure 4:
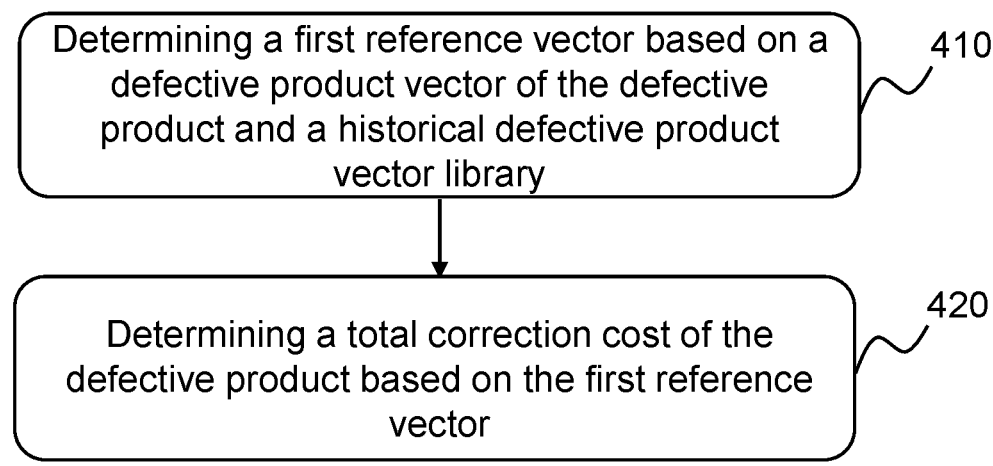
FIG. 4 is an exemplary flowchart illustrating the control method for the industrial IoT for correction and regulation of defective product according to some embodiments of the present disclosure.

FIG. 4 is an exemplary flowchart illustrating the control method for the industrial IoT for correction and regulation of defective product according to some embodiments of the present disclosure. In some embodiments, a process 400 may be performed by a total correction cost determination module. As shown in FIG. 4, the process 400 includes the following operations.

in 410, determining a first reference vector based on a defective product vector of the defective product and a historical defective product vector library.

The defective product vector refers to a vector formed by coding a defective product data.

The defective product data refers to data information related to the defective product. For example, the defective product data may include defective product information and a defective product parameter.

In some embodiments, the defective product information may include at least a name, a number and a model of the product corresponding to the defective product. For example, the defective product information may include a camshaft, a product number 01, and a model of the product GT-TLZ-03.

In some embodiments, the defective product parameter may at least include a defective product parameter number and a defective product error of the product corresponding to the defective product. For example, the defective product parameter may include the defective product parameter number 02, and the defective product error −3 mm.

In some embodiments, the defective product data may be determined based on a detection record of a product detection device. For example, the defective product data may include a camshaft, a product number 01, a model of the product GT-TLZ-03, a defective product parameter number 02, and a defective product error −3 mm, then the defective product vector formed by encoding the defective data may be (12, 01, 103, 02, −3). In the vector, 12 is camshaft code, 01 is the product number, 103 is the model code of the product, 02 is the defective product parameter number, and −3 is the defective product error code.

A historical defective product vector library refers to a vector database that includes a plurality of historical defective product vectors. Each historical defective product vector may be formed by coding a corresponding historical defective product data. For example, the historical defective product vector may be (corresponding product name, product number, product model, defective product parameter number, defective product error).

The first reference vector refers to the vector closest to the defective product vector of the defective product in the historical defective product vector library. For example, the first reference vector may include one or more historical defective product vectors that are closest to the defective product vector of the defective product in the historical defective product vector library.

In some embodiments, a processor may respectively calculate distances between all historical defective product vectors in the historical defective product vector library and the defective product vector of the defective product, and select one or more historical defective product vectors with the smallest distance as the first reference vector. A number of the first reference vector may be set manually. In some embodiments, the processor may calculate the Euclidean distance between the defective product vector of the defective product and a certain vector in the historical defective product vector library to obtain the distance between the two vectors. For example, the defective product vector of the defective product is (12, 01, 103, 02, −3), and the vector in the historical defective product vector library is (10, 01, 102, 01, −3), the distance between the defective product vector of the defective product and the vector in the historical defective product vector library is:

$$\sqrt{(12-10)^2 + (01-01)^2 + (103-102)^2 + (02-01)^2 + (-3-(-3))^2} = \sqrt{6}.$$

In 420, determining a total correction cost of the defective product based on the first reference vector.

The total correction cost refers to the cost required for correcting one or more defective products.

In some embodiments, when there is only one first reference vector, the processor may directly use the correction cost corresponding to the first reference vector as the total correction cost. For example, if a number of the preset first reference vector is one, the processor may respectively calculate the distances between all historical defective product vectors in the historical defective product vector library and the defective product vector of the defective product, and select one historical defective product vector with the smallest distance as the first reference vector, and take a historical actual correction cost corresponding to the first reference vector as the total correction cost.

In some embodiments, when there is a plurality of first reference vectors, the processor may average the correction costs corresponding to the plurality of first reference vectors to determine the total correction cost. For example, if the number of preset first reference vectors is multiple, the processor may respectively calculate the distances between all historical defective product vectors in the historical defective product vector library and the defective product vector of the defective product, and select the historical defective product vectors with the smallest distances as the plurality of first reference vectors, and take the average value of a plurality of historical actual correction costs corresponding to the plurality of first reference vectors as the total correction cost.

In some embodiments, when there is a plurality of first reference vectors, the processor may further predict the total correction cost through a first prediction model. For more content about predicting the total correction cost through a first prediction model, please refer to FIG. 5 and its related descriptions.

According to some embodiments of the present disclosure, the first reference vector may be determined based on the defective product vector of the defective products and the historical defective product vector library, and then the total correction cost may be determined. In this way, while improving a prediction accuracy of the total correction cost, the efficiency of predicting the total correction cost may be improved as well.

It should be noted that the description of the above-mentioned process 400 is only for examples and descriptions, but does not limit the scope of the application of the present disclosure. For those skilled in the art, various modifications and changes may be made to the process 400 under the guidance of the present disclosure. However, these corrections and changes are still within the scope of present disclosure.

Figure 5:
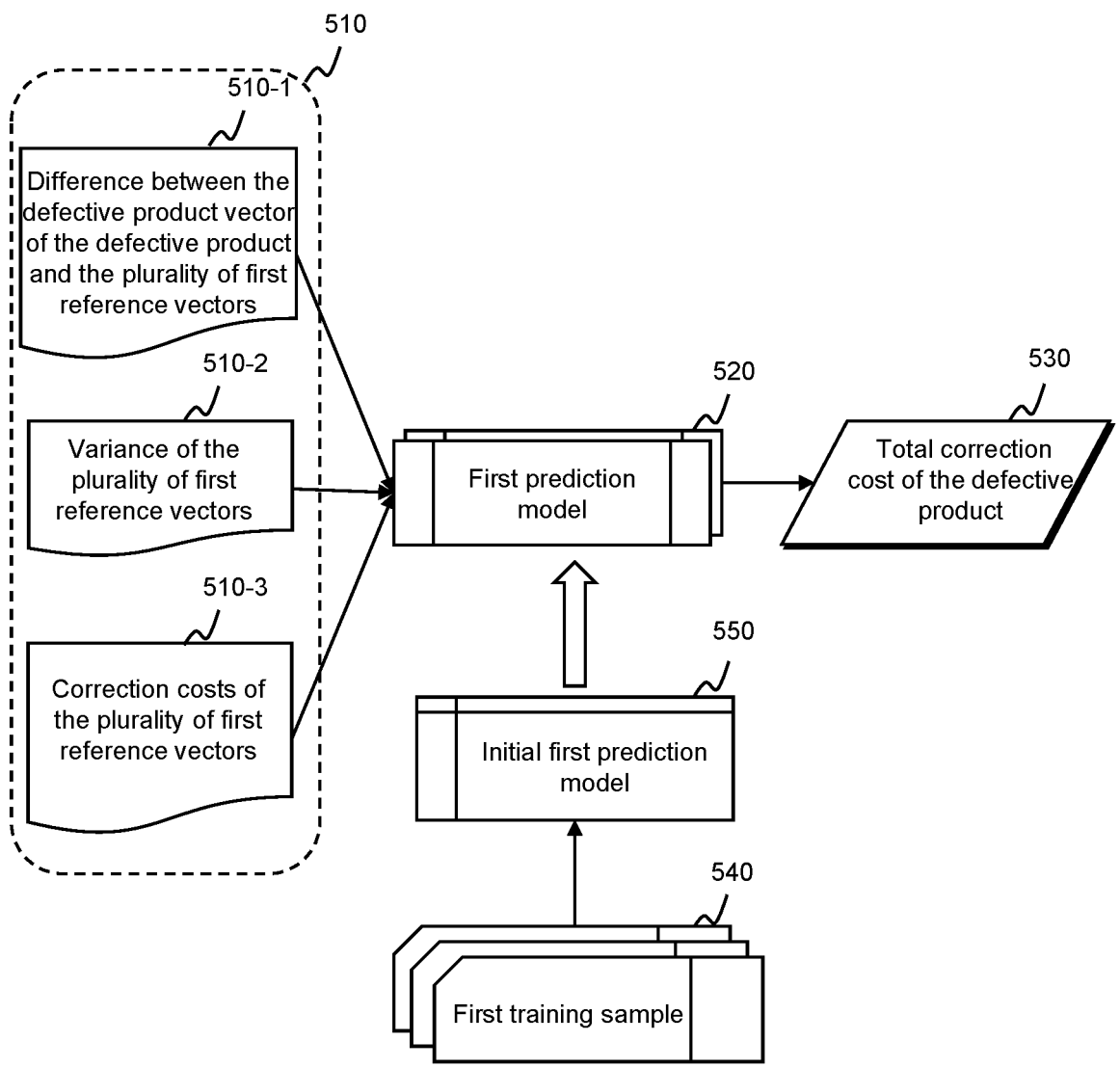
FIG. 5 is an exemplary flowchart illustrating determining a total cost for the defective product correction according to some embodiments of the present disclosure.

FIG. 5 is an exemplary flowchart illustrating determining a total correction cost for the defective product according to some embodiments of the present disclosure.

In some embodiments, a processor may determine a total correction cost of a defective product through a first prediction model based on a plurality of first reference vectors. The first prediction model may be a machine learning model.

In some embodiments, the first prediction model may include a Neural Networks (NN) model.

In some embodiments, as shown in FIG. 5, an input of the first prediction model may include a difference 510-1 between the defective product vector of the defective product and the plurality of first reference vectors, a variance 510-2 of the plurality of first reference vectors, and the correction costs 510-3 of the plurality of first reference vectors. An output of the first prediction model may include the total correction cost 530 of the defective product.

The difference refers to a vector difference between the defective product vector of the defective product and the plurality of first reference vectors. For example, the defective product vector of a certain defective product is (12, 01, 103, 02, −3), and one of the first reference vectors is (12, 01, 103, 02, −5), then the difference (0, 0, 0, 0, 2) between the defective product vector of a certain defective product and the first reference vector is a set of difference result. In some embodiments, the defective product vector may produce a plurality of difference results with the plurality of first reference vectors.

In some embodiments, as shown in FIG. 5, the first prediction model 520 may be obtained by training a plurality of first training samples 540 with labels. For example, the labeled first training sample 540 may be input to an initial first prediction model 550, a loss function may be constructed through the label and an output of the initial first prediction model 550, and a parameter of the initial first prediction model 550 may be iterated by a gradient descent or other approaches based on the loss function. When the loss function of the initial first prediction model 550 satisfies a preset condition, the model training is completed, and the trained first prediction model 520 may be obtained. The preset condition may be a convergence of the loss function, a number of iterations reaching a first training threshold, etc.

In some embodiments, the first training sample 540 may at least include a difference between a sample defective product vector and a plurality of sample first reference vectors, a variance of a plurality of sample first reference vectors, and a corresponding correction cost of the plurality of sample first reference vectors. The label of the first training sample 540 may indicate the total correction cost of the sample defective product. The label may be determined based on an actual total correction cost of the sample defective product.

In some embodiments, when a certain defective product vector in the historical defective product vector library is selected as the sample defective product vector, and the difference between the sample defective product vector and the plurality of sample first reference vectors, the variance of the plurality of sample first reference vectors, and the corresponding correction costs of the plurality of sample first reference vectors are used as the training samples, the defective product vector in the historical defective product vector library may be deleted.

In some embodiments of the present disclosure, through the first prediction model processing the difference between the sample defective product vector and the plurality of sample first reference vectors, the variance of the plurality of sample first reference vectors, and the corresponding correction costs of the plurality of sample first reference vectors, and considering the difference between the sample defective product vector and the plurality of sample first reference vectors, and the variance of the plurality of sample first reference vectors, the total correction cost of the defective product may be accurately determined. At the same time, the correction cost is predicted through the first prediction model, which may greatly improve the prediction accuracy.

FIG. 6 is an exemplary flowchart illustrating the control method for the industrial IoT for correction and regulation of defective product according to some other embodiments of the present disclosure. In some embodiments, the process 600 may be performed by a total correction cost determination module. As shown in FIG. 6, the process 600 includes the following operations.

In 610, performing a filtering operation on a defective product vector of the defective product to obtain a first defective product vector and a second defective product vector.

The first defective product vector refers to the defective product vector corresponding to the defective product generated by accidental reasons. For example, the first defective product vector may be the defective product vector corresponding to a defective product caused by insufficient single cutting.

The second defective product vector refers to the defective product vector corresponding to the defective product generated by a systematic reason. For example, the second defective product vector may be the defective product vector corresponding to a plurality of defective products formed due to the use of an inappropriate machining time (for example, 20 min, 30 min, 40 min, etc.), resulting in the same cutting error for a plurality of products.

In some embodiments, the first defective product vector may be a filtered-out defective product vector (or also referred to as the removed defective product vector), and the second defective product vector may be a defective product vector left after filtering (or also referred to as the remaining defective vector after filtering). A processor may perform the filtering operation on the defective product vector using filtering algorithms such as a clipping filtering, a median filtering, and a tail-cutting mean filtering, etc. In some embodiments, the processor may calculate a sum of the distances between each defective product vector and all the other defective product vectors, and when the sum of the distances is greater than a distance threshold, the defective vector may be used as the first defective product vector, and the first defective product vector may be the filtered-out defective product vector. When the sum of the distances is less than the distance threshold, the defective product vector may be used as the second defective product vector, and the second defective product vector may be the defective product vector left after filtering.

In some embodiments, the distance threshold of the filtering operation may be a value set manually according to experience.

The defective product vectors may be clarified into the first and second defective product vectors by filtering, which may distinguish random errors and systematic errors, so that different algorithms may be used to calculate a corresponding first total correction cost and a second total correction cost to finally obtain the total correction cost.

In 620, determining the first total correction cost based on the first defective product vector.

The first total correction cost refers to a sum of the total correction costs corresponding to all the first defective product vectors.

In some embodiments, the processor may determine the second reference vector for each first defective product vector based on the first defective product vector and the historical defective product vector library. The second reference vector may be one or more historical defective product vectors in the historical defective product vector library that are closest to the first defective product vector. Then, the processor may determine the total correction cost corresponding to each first defective product vector based on the second reference vector. The approach for determining the total correction cost corresponding to the first defective product vector is similar to that for determining the total correction cost corresponding to the first reference vector. For details, please refer to FIG. 4 and related descriptions. Further, the processor may determine the first total correction cost based on the total correction cost corresponding to each first defective product vector.

In 630, clustering the second defective product vector to determine at least one cluster center set.

The cluster center set may include one or more cluster centers.

The set of the second defective product vector may include the defective product vector of a plurality of defective products. The cluster center set may include one or more cluster centers. The cluster center may represent a type of a systemic reason. In some embodiments, the processor may use a clustering algorithm to cluster the set of the second defective product vectors to determine the cluster center set. The clustering algorithm may include but not limited to a K-means clustering algorithm (K-Means), and/or a density-based spatial clustering of applications with noise (DB-SCAN), etc.

Through clustering, the second defective product vector may be divided into at least one cluster center set, then the total correction cost of each cluster center set may be determined, and the systematic errors may be divided into several categories for cost prediction, so that the determined second total correction cost may be more precise.

In 640, determining at least one second total correction cost based on at least one cluster center set.

The second total correction cost refers to a sum of the total correction cost corresponding to all second defective product vectors.

In some embodiments, the processor may calculate an average vector of the second defective product vector in each cluster center set. For example, a cluster center set is formed by three second defective product vectors (12, 01, 103, 01, −3), (12, 01, 104, 02, −6) and (12, 01, 105, 03, −9), then the average vector may be (12, 01, 104, 02, −6). The processor may determine a third reference vector for each average vector based on the average vector and the historical defective product vector library. The third reference vector may be one or more historical defective product vectors in the historical defective product vector library that are closest to each average vector. Then, the processor may determine the total correction cost corresponding to each average vector based on the third reference vector. The approach for determining the total correction cost corresponding to each average vector is similar to the approach for determining the total correction cost corresponding to the first reference vector. For details, please refer to FIG. 4 and related descriptions. Further, the processor may multiply the number of defective product vectors in the cluster center set by the total correction cost corresponding to each average vector to obtain the total correction cost for each cluster center set. Then, the total correction cost of each cluster center set may be added to determine the first total correction cost.

In some embodiments, the processor may determine the number of raw material and manpower required for the cluster center set based on the second prediction model, and then determine the second total correction cost. For more contents about determining the second total correction cost, please refer to FIG. 7 and the related descriptions.

In 650, determining a total correction cost based on the first total correction cost and the at least one second total correction cost.

In some embodiments, the total correction cost may be obtained through adding the first total correction cost and the second total correction cost. For example, the first total correction cost is 100 yuan, and the second total correction cost is 200 yuan, then the total correction cost is 300 yuan.

The defective product vector may be divided into the first defective product vector and the second defective product vector through the filtering operation described in some embodiments of the present disclosure, and different algorithms may be used to calculate the corresponding first total correction cost and the second total correction cost respectively, and finally the total correction cost may be obtained. In this way, predictions in different categories may distinguish random errors and systematic errors, so that the prediction of the correction cost may be more refined, and the prediction accuracy of the total correction cost may be improved.

It should be noted that the description of the above-mentioned process 600 is only for examples and descriptions, but does not limit the scope of the application of the present disclosure. For those skilled in the art, various modifications and changes may be made to process 600 under the guidance of the present disclosure. However, these corrections and changes are still within the scope of present disclosure.

Figure 7:
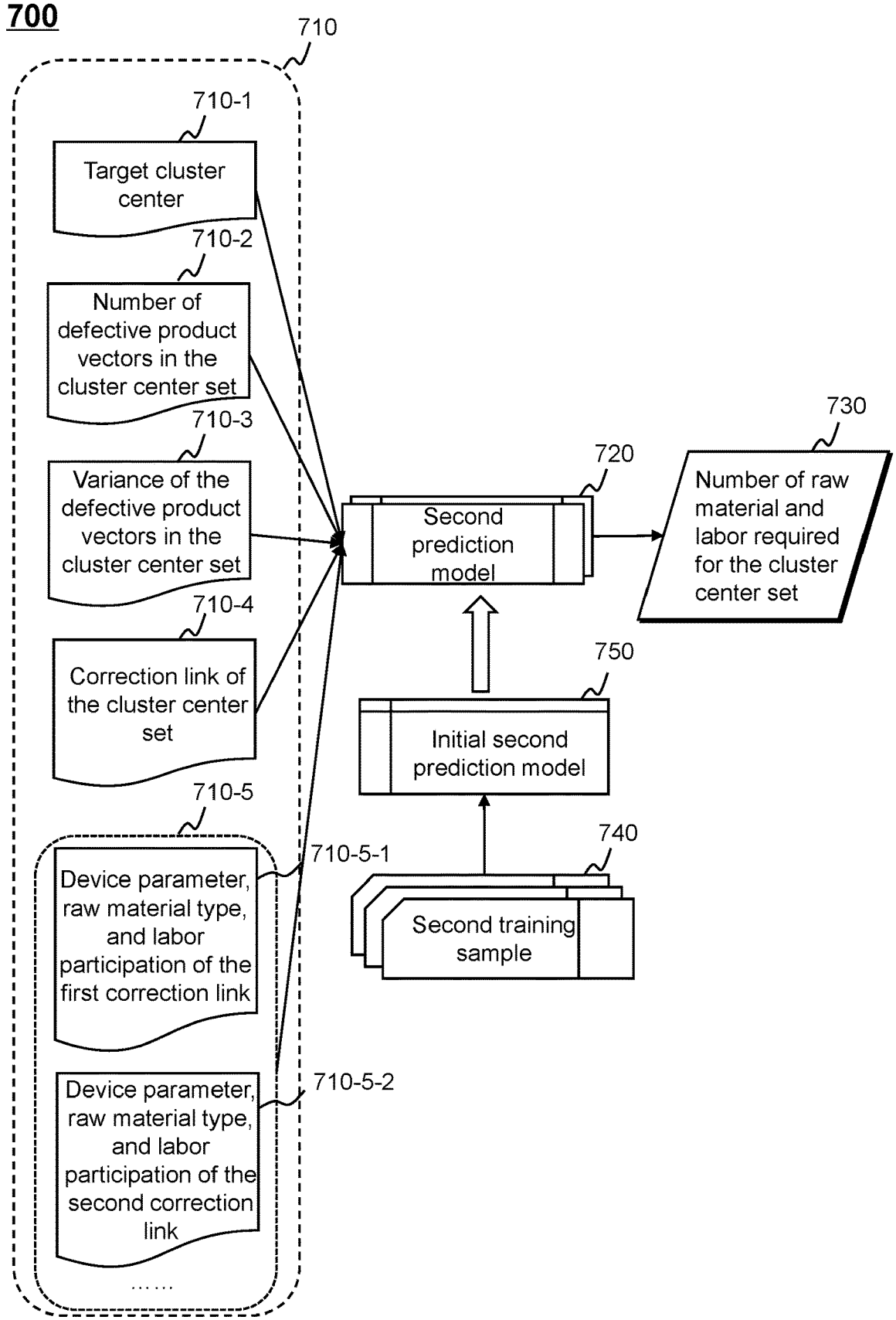
FIG. 7 is an exemplary flowchart illustrating the determining a number of raw material and manpower required for a cluster center set according to some embodiments of the present disclosure.

FIG. 7 is an exemplary flowchart illustrating the determining a number of raw material and manpower required for a cluster center set according to some embodiments of the present disclosure.

As a variance of the defective product vector in the cluster center set may reflect a dispersion degree of defective product vector in the cluster center set, the dispersion degree is the smaller, indicating that it is more likely to be the defective product caused by the same systematic reason. A correction link of the cluster center set may reflect a number of raw material and manpower required for the correction link. In some embodiments, for each cluster center set, a second prediction model may determine the number of raw material and manpower based on the target cluster center, the number of defective product vectors in the cluster center set, the variance of the defective product vectors in the cluster center set, the correction links of the cluster center set, as well as a device parameter, a raw material type, and a labor participation of each correction link. Based on the determined number of raw material and manpower required for each cluster center set, the second prediction model may determine at least one second total correction cost.

In some embodiments, a second prediction model 720 may be a long short-term memory network (LSTM).

In some embodiments, as shown in FIG. 7, an input 710 of the second prediction model may include a target cluster center 710-1, the number of defective product vectors in the cluster center set 710-2, the variance of the defective product vectors in the cluster center set 710-3, the correction link of the cluster center set 710-4, the device parameter, the raw material type, and the labor participation of each correction link 710-5.

The target cluster center may refer to a cluster center in the cluster center set that is closest to the second defective product vector. The method of calculating the distance may include Euclidean distance, cosine distance, Markov distance, Chebyshev distance, Manhattan distance, or the like, or any combination thereof.

The correction link refers to a processing approach of correcting this type of defective product. In some embodiments, there may be more than one correction links. For example, the correction link may include machining, welding, and polishing. In some embodiments, the processor may determine the correction link based on the defective product parameter number. For example, when the defective product parameter number is 02 representing the weld parameter, the corresponding correction link is welding.

In some embodiments, the correction link may include a first correction link and a second correction link. As shown in FIG. 7, the device parameter, the raw material type, and the labor participation of each correction link 710-5 may include the device parameter, the raw material type, the labor participation of the first correction link 710-5-1, and the device parameter, the raw material type, the labor participation of the second correction link 710-5-2.

In some embodiments, the first correction link may be the correction link before the second correction link. For example, when performing the defective product correction, the machining process may be performed first, and then the welding process may be performed. Then the machining process is the first correction link, and the welding process is the second correction link.

In some embodiments, when the second prediction model is the LSTM model, since the device parameter, the raw material type, and the labor participation of each correction link are not input to the second prediction model at one time, but are input to the second prediction model in sequence, there may be a mutual influence between the sequence of multiple correction links. For example, the correction of the machining process may further affect the correction of the welding process. Therefore, the device parameter, the raw material type, and the labor participation of the second correction link input to the second prediction model may be relevant to the device parameter, the raw material type, and the labor participation of the first correction link. In some embodiments, the second prediction model may take the relevant information of the first correction link as the input of the second correction link. For example, when the first correction link is the machining process and the second correction link is the welding process, and the input of the first correction link includes the device parameter, the raw material type, and the labor participation of the machining process, then the input of the second correction link may include the device parameter, the raw material type, and the labor participation of the machining process, as well as the device parameter, the raw material type, and the labor participation of the welding process.

When inputting the device parameter, the raw material type, and the labor participation of each correction link, the possible mutual influence of the sequence of multiple correction links may be considered, so that the number of raw material and labor required for the clustering center set determined by the second prediction model may be more precise.

The device parameter refers to a processing parameter of the device in the correction link. For example, the device parameter may be parameters such as a cutting pressure and a cutting time of a cutting device. In some embodiments, the device parameter may be determined by a manual setting according to a correction experience.

The raw material type may refer to the type of correction material needs to be used in the correction link. For example, the types of raw material may be a welding rod, a welding wire, etc. In some embodiments, there may be more than one type of raw material, and the material types may be determined based on the defective product parameter number. For example, when the defective product parameter number is 02, which indicates the weld parameter, the raw material types may include a welding rod, a welding wire, a metal powder, and a solder.

The labor participation may refer to a value reflecting a manpower cost required in the correction link. In some embodiments, the labor participation of each correction link may be a value preset manually according to the experience, and the value may be between 0 to 1. The greater the value of the labor participation is, the higher the manpower cost required for the correction link is.

In some embodiments, as shown in FIG. 7, the output of the second prediction model 720 may include the number of raw material and labor required for the cluster center set 730. The processor may predict each cluster center set through the second prediction model 720 to obtain the number of raw material and labor required for each cluster center set.

In some embodiments, the second prediction model may be obtained through training a plurality of labeled second training samples 740. For example, the plurality of labeled second training samples 740 may be input to an initial second prediction model 750, a loss function may be built by the labels and an output result of the initial second prediction model 750, and a parameter of the initial second prediction model 750 may be iteratively updated based on the loss function. When the loss function of the initial second prediction model 750 satisfies a preset condition, the model training is completed, and the trained second prediction model 720 may be obtained. The preset conditions may be that the loss function converges, the number of iterations reaches a second training threshold, etc.

In some embodiments, the second training sample 740 may at least include a set of sample target cluster centers, a number of defective product vectors in the sample cluster center sets, a variance of the defective product vectors in the sample cluster center set, the correction link of the sample cluster center set, the device parameters, the raw material type, and the labor participation of each correction link. The defective product corresponding to each set of training data may be caused by the same systematic reason. The label may indicate the number of raw material and manpower required for the sample cluster center set. The label may be obtained based on the number of raw material and manpower required for an actual correction of the sample cluster center.

In some embodiments, the total correction cost of each cluster center set=a raw material cost×the number of raw material+a manpower cost×the number of manpower. The raw material cost may be obtained based on procurement data, and the manpower cost may be obtained based on human resources data. Then the second total correction cost may be a sum of the total correction costs of all cluster center sets.

By determining the second total correction cost based on the second prediction model according to some embodiments of the present disclosure, an accuracy and an efficiency of the prediction may be improved.

The present disclosure provides a non-transitory computer readable storage medium. The storage medium may be configured to store computer instructions. when reading the computer instructions in the storage medium, a computer implements the control method of an industrial IoT for correction and regulation of defective product.

The basic concepts have been described above, apparently, for those skilled in the art, the above detailed disclosure is only an example, and does not constitute a limitation of the present disclosure. Although there is no clear explanation here, those skilled in the art may make various modifications, improvements, and modifications of present disclosure. Such modifications, improvements, and corrections are suggested in the present disclosure, so such modifications, improvements, and corrections still belong to the spirit and scope of the exemplary embodiments of the present disclosure.

Meanwhile, this specification uses specific words to describe embodiments of the present specification. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although the above disclosure discusses some embodiments of the present disclosure currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate", or "substantially". Unless otherwise stated, "about," "approximate," or "substantially" may indicate +20% variation of the value it describes. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure) are also excluded. It should be noted that if a description, definition, and/or terms in the subsequent material of the present disclosure are inconsistent or conflicted with the content described in the present disclosure, the use of description, definition, and/or terms in this disclosure shall prevail.

Finally, it should be understood that the embodiments described herein are only configured to illustrate the principles of the embodiments of the present disclosure. Other deformations may also belong to the scope of the present disclosure. Thus, as an example, not a limitation, the alternative configuration of the embodiment of the present disclosure may be consistent with the teachings of the present disclosure. Accordingly, the embodiments of the present disclosure are not limited to the embodiments of the present disclosure clearly introduced and described.

What is claimed is:

1. An industrial Internet of Things (IoT) for determining repairability of a defective product, including: an obtaining module, a total correction cost determination module, and a defective product processing module, wherein the obtaining module is configured to obtain defective product data;

the total correction cost determination module is configured to:

in response to a determination that a number of the defective product is larger than 1, perform a filtering operation on a defective product vector of the defective product to obtain a first defective product vector and a second defective product vector, the defective product vector being constructed based on the defective product data, wherein the first defective product vector is a filtered-out defective product vector, and the second defective product vector is a defective product vector left after filtering;

determine, based on the first defective product vector, a first total correction cost;

cluster the second defective product vector to determine at least one cluster center set;

for each of the at least one cluster center set, determine, based on one or more center set features, a number of raw material and manpower required by the cluster center set through a prediction model, the prediction model being a machine learning model; wherein the prediction model is obtained through training based on a plurality of labeled training samples, and a training process of the prediction model includes:

inputting the plurality of labeled training samples to an initial prediction model, constructing a loss function by the labels and an output result of the initial prediction model, and updating a parameter of the initial prediction model iteratively based on the loss function; wherein when the loss function of the initial prediction model satisfies a preset condition, the training process is completed, and a trained prediction model is obtained; and the training samples including sample center set features of a plurality of sample cluster center sets, and the labels indicating a number of raw material and manpower required for the sample cluster center sets;

determine, based on the number of raw material and the manpower required by the each of the at least one cluster center set, at least one second total correction cost; and determine, based on the first total correction cost and the at least one second total correction cost, a total correction cost; and the defective product processing module is configured to determine, based on the total correction cost and a preset cost, whether the defective product is repairable, and perform repair of the defective product based on the determination that the defective product is repairable.

2. The industrial IoT of claim 1, wherein the one or more center set features include a target cluster center, a number of defective product vectors in the cluster center set, a variance of the defective product vectors in the cluster center set, at least one correction link of the cluster center set, and a device parameter, a type of raw material, and a labor participation of each of the at least one correction link.

3. The industrial IoT of claim 2, wherein the prediction model is a long short term memory model, the at least one correction link of the cluster center set includes a first correction link and a second correction link, the first correction link is a correction link before the second correction link, the device parameter, the type of raw material, and the labor participation of the second correction link input by the long short term memory model are related to the device parameter, the type of raw material, and the labor participation of the first correction link.

4. The industrial IoT of claim 1, wherein the total correction cost determination module is further configured to:
for each of the first defective product vector,
determine, based on the first defective product vector and a historical defective product vector library, a second reference vector;
determine, based on the second reference vector, a total correction cost corresponding to the each of the first defective product vector; and
determine, based on the total correction cost corresponding to the each of the first defective product vector, the first total correction cost.

5. The industrial IoT of claim 1, comprising: a user platform, a service platform, a management platform, a sensing network platform, and an object platform that interact from top to bottom, wherein the obtaining module is performed by the object platform, the total correction cost determination module is performed by the sensing network platform and the management platform, and the defective product processing module is performed by the user platform, the service platform, the management platform, the sensing network platform, and the object platform;
the service platform, the management platform, and the sensing network platform are all arranged in a front-sub-platform layout; the front-sub-platform layout refers to that a corresponding platform is provided with a general platform and a plurality of sub-platforms, the plurality of sub-platforms respectively store and process data of different types and different receiving objects sent by a lower platform, the general platform stores and processes the data of the plurality of sub-platforms after summary, and transmits the data of the plurality of sub-platforms to an upper platform;
the object platform is configured as a product detection device of intelligent manufacture; when the product detection device detects the defective product, the product detection device packs defective product information and a defective product parameter as the defective product data, and sends the defective product data to the management platform;
the management platform is configured to determine the total correction cost based on the defective product data, compare the total correction cost with the preset cost of the general platform of the management platform, and perform the preset operation based on a comparison result, wherein the preset cost is a single-piece manufacturing cost of a product corresponding to the defective product.

6. The industrial IoT of claim 5, wherein the preset operation includes:
in response to the comparison result that the total correction cost is lower than the preset cost, determining that the defective product is repairable, the general platform of the management platform issuing a correction instruction to the corresponding sub-platform of the management platform, the general platform of the sensing network platform, the sub-platform of the sensing network platform, and the product detection device based on a first description item, the product detection device receiving the correction instruction and assigning the corresponding product to a defective product correction assembly line based on the first description item.

7. The industrial IoT of claim 5, wherein the defective product information at least includes a name, a number, and a type of the product corresponding to the defective product; and the defective product parameter at least includes a defective product parameter number and an error of the product corresponding to the defective product.

8. The industrial IoT of claim 5, wherein when the total correction cost is greater than the preset cost, the general platform of the management platform is further configured to:
issue a processing instruction to the corresponding sub-platform of the management platform, the general platform of the sensing network platform, the sub-platform of the sensing network platform, and the product detection device, and the product detection device perform a defective product processing on the corresponding defective product based on the processing instruction.

9. A control method of an industrial Internet of Things (IoT) for determining repairability of a defective product, comprising:
obtaining defective production data;
determining that a number of the defect product is larger than 1, in response to determining that a number of the defective product is larger than 1, performing a filtering operation on a defective product vector of the defective product to obtain a first defective product vector and a second defective product vector, the defective product vector being constructed based on the defective product data, wherein the first defective product vector is a filtered-out defective product vector, and the second defective product vector is a defective product vector left after filtering;
determining, based on the first defective product vector, a first total correction cost;
clustering the second defective product vector to determine at least one cluster center set;
for each of the at least one cluster center set, determining, based on one or more center set features, a number of raw material and manpower required by the cluster center set through a prediction model, the prediction model being a machine learning model; wherein the prediction model is obtained through training based on a plurality of labeled training samples, and a training process of the prediction model includes:
inputting the plurality of labeled training samples to an initial prediction model, constructing a loss function by the labels and an output result of the initial prediction model, and updating a parameter of the initial prediction model iteratively based on the loss function;
wherein when the loss function of the initial prediction model satisfies a preset condition, the training process is completed, and a trained prediction model is obtained; and
the training samples including sample center set features of a plurality of sample cluster center sets, and the labels indicating a number of raw material and manpower required for the sample cluster center sets;
determining, based on the number of raw material and the manpower required by the each of the at least one cluster center set, at least one second total correction cost; and
determining, based on the first total correction cost and the at least one second total correction cost, a total correction cost; and
determining, based on the total correction cost and a preset cost, that the defective product is repairable, and performing repair of the defective product based on the determination that the defective product is repairable.

10. The control method of the industrial IoT of claim 9, wherein the one or more center set features include a target cluster center, a number of defective product vectors in the cluster center set, a variance of the defective product vectors in the cluster center set, at least one correction link of the cluster center set, and a device parameter, a type of raw material, and a labor participation of each of the at least one correction link.

11. The control method of the industrial IoT of claim 10, wherein the prediction model is a long short term memory model, the at least one correction link of the cluster center set includes a first correction link and a second correction link, the first correction link is a correction link before the second correction link, the device parameter, the type of raw material, and the labor participation of the second correction link input by the long short term memory model are related to the device parameter, the type of raw material, and the labor participation of the first correction link.

12. The control method of the industrial IoT of claim 9, wherein the determining, based on the first defective product vector, a first total correction cost includes:
for each of the first defective product vector,
determining, based on the first defective product vector and a historical defective product vector library, a second reference vector;
determining, based on the second reference vector, a total correction cost corresponding to the each of the first defective product vector; and
determining, based on the total correction cost corresponding to the each of the first defective product vector, the first total correction cost.

13. The control method of the industrial IoT of claim 9, wherein the industrial IoT includes: a user platform, a service platform, a management platform, a sensing network platform, and an object platform that interact from top to bottom;
the service platform, the management platform, and the sensing network platform are all arranged in a front-sub-platform layout; the front-sub-platform layout refers to that a corresponding platform is provided with a general platform and a plurality of sub-platforms, the plurality of sub-platforms respectively store and process data of different types and different receiving objects sent by a lower platform, the general platform stores and processes the data of the plurality of sub-platforms after summary, and transmits the data of the plurality of sub-platforms to an upper platform;
the object platform is configured as a product detection device of intelligent manufacture; when the product detection device detects the defective product, the product detection device packs defective product information and a defective product parameter as the defective product data, and sends the defective product data to the management platform;
the management platform is configured to determine the total correction cost based on the defective product data, compare the total correction cost with the preset cost of the general platform of the management platform, and perform the preset operation based on a comparison result, wherein the preset cost is a single-piece manufacturing cost of a product corresponding to the defective product.

14. The control method of the industrial IoT of claim 13, wherein the preset operation includes:
in response to the comparison result that the total correction cost is lower than the preset cost, determining that the defective product is repairable, the general platform of the management platform issuing a correction instruction to the corresponding sub-platform of the management platform, the general platform of the sensing network platform, the sub-platform of the sensing network platform, and the product detection device based on a first description item, the product detection device receiving the correction instruction and assigning the corresponding product to a defective product correction assembly line based on the first description item.

15. The control method of the industrial IoT of claim 13, wherein the defective product information at least includes a name, a number, and a type of the product corresponding to the defective product; and the defective product parameter at least includes a defective product parameter number and an error of the product corresponding to the defective product.

16. The control method of the industrial IoT of claim 13, wherein the preset operation includes:
the general platform of the management platform issuing a processing instruction to the corresponding sub-platform of the management platform, the general platform of the sensing network platform, the sub-platform of the sensing network platform, and the product detection device, and the product detection device performing a defective product processing on the corresponding defective product based on the processing instruction.

17. A non-transitory computer-readable storage medium storing computer instructions, wherein when reading the computer instructions in the storage medium, a computer implements the method of claim 9.

* * * * *